PARALLEL DIGITAL TO A.C. ANALOG CONVERTER

Filed Aug. 7, 1957

INVENTORS
GEORGE S. STRINGFELLOW
ERWIN J. EMKJER
BY
Walter J. Jason
ATTORNEY

United States Patent Office 2,970,308

Patented Jan. 31, 1961

2,970,308

PARALLEL DIGITAL TO A.C. ANALOG CONVERTER

George S. Stringfellow and Erwin J. Emkjer, San Diego, Calif., assignors to General Dynamics Corporation, San Diego, Calif., a corporation of Delaware Filed Aug. 7, 1957, Ser. No. 676,829

3 Claims. (Cl. 340—347)

This invention relates to digital to analog circuits and more particularly to a transistorized circuit for converting parallel digital numbers to an A.C. analog voltage whose amplitude is proportional to the digital input.

One type of digital to analog converter uses a multi-winding transformer having relay switches on each winding to selectively remove or insert voltages therein in series to provide a voltage amplitude output indicative of the digital input which has selectively energized various combinations of the switches. The use of electro-mechanical relays has the usual disadvantages of mechanical moving parts such as slow response time, gaps in the output voltage waveform and susception to vibrational environments.

The digital to analog circuit comprising the present invention converts parallel digital information to an A.C. analog voltage whose amplitude is proportional to the digital input by removing or inserting voltages in series. This is accomplished by using a plurality of voltage sources selectively connected by pairs of transistors operated in the switching mode. Since this converter has no moving parts it has the obvious advantages of faster response time with no gaps in the output, has greater reliability under vibrational environments and it can be constructed smaller and lighter than other devices performing the same function.

It is therefore an object of this invention to provide for a novel digital to A.C. analog converter having no moving parts.

Another object is the provision of a plurality of voltage sources selectively connected in series wherein digital signals determine the various combinations of voltage sources so connected.

Another object is the provision of complementary driven transistors in parallel paths for connecting a plurality of voltage sources in series to selectively vary the output amplitude.

Another object is the provision of a digital to analog circuit wherein transistors in parallel paths are controlled in a complementary manner by digital input information to thereby selectively add a plurality of voltage sources in series.

Other objects and features of the present invention will be readily apparent to those skilled in the art from the following specification and appended drawings wherein is illustrated a preferred form of the invention, and in which.

Figure 2:
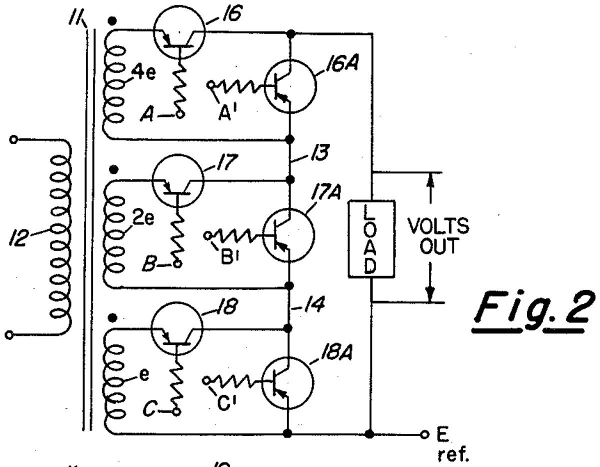
Figure 2 is an exemplary circuit used to explain the principle of operation of the converter.
Figures 1, 3:
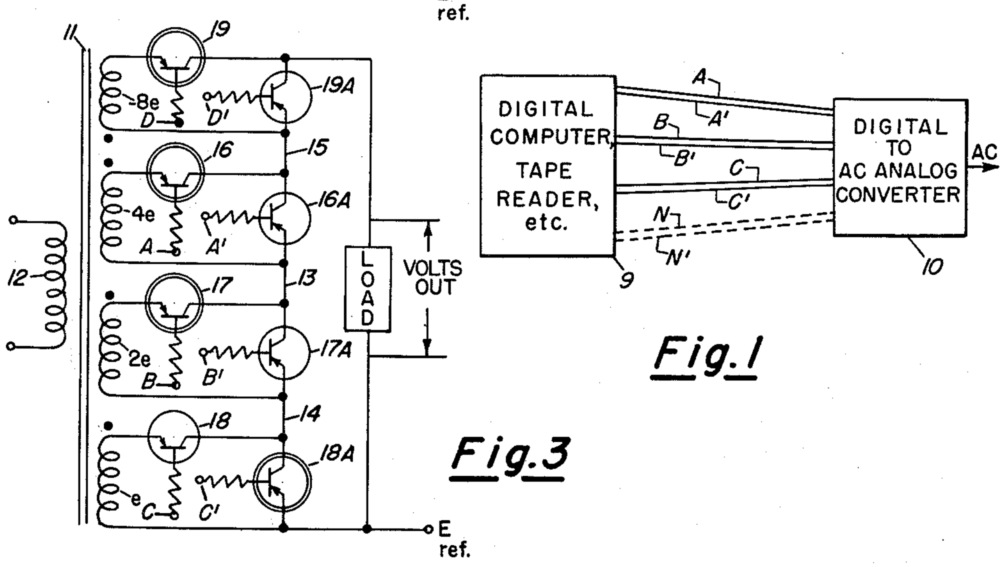
Figure 1 shows an example of use of the converter.
Figure 3 shows one embodiment having both positive and negative outputs.

Transistors selectively operating in their cut off region or in their region of saturation are often used to control current flow in an electrical path. The transistor at its cut off region has a high impedance between its emitter and collector whereas a transistor in its saturation region presents a low impedance between its emitter and collector. When the voltage on the base of a transistor is lower than the voltages on both the emitter and collector, the resistance between emitter and collector is very small, permitting current passage therethrough. When the base voltage is higher than both emitter and collector, the resistance between the emitter and collector is high and essentially no current flows. Figure 1 shows one application of the converter comprising the present invention in which this characteristic of transistors is utilized. Here a digital output device 9 such as a computer, tape reader, programmer or similar device is connected to the digital to A.C. analog converter 10 by a plurality of parallel paths A, A′, B, B′, C, C′, etc. One of each of the parallel paths has a high voltage and the other path a low voltage as dictated by the digital output device 9. For example, if path A has a high voltage, path A′ has a low voltage and vice versa. In this respect paths A and A′ are considered complementary to each other. Figure 2 shows the converter 10 using a three winding transformer 11. An A.C. voltage of uniform amplitude is connected to the primary winding 12. The three output windings, $e$, $2e$ and $4e$ are wound in the same direction as shown by the position of the respective dots. The letter $e$ represents a given number of turns or a given unit of voltage output, so that $2e$ represents two times as much, etc. With all three windings serially connected the output would be 7 units of voltage, the $4e$ and $2e$ connected would produce a 6 unit voltage, the $e$ and $2e$ connected would produce 3 units. The various combinations will produce from 0 to 7 units depending upon the combination selected.

To provide for selection of the desired combinations, the transformer windings are serially connected by leads 13, 14, and transistors 16, 17, and 18 are connected with their emitters and collectors in circuit to form voltage source paths. Transistors 16A, 17A and 18A are connected across these voltage source paths to provide alternate circuit paths or voltage source by-pass paths. These transistors are also connected with the emitters and collectors in circuit.

The bases of transistors 16, 16A; 17, 17A; and 18, 18A are connected through suitable resistances to the digital output device 9 which will at all times cause one of the transistors of a pair to be cut off and the other to be at its region of saturation in a complementary manner. Some D.C. reference voltage of a value approximately midway between the voltages on A or A′, B or B′, etc. is applied to the terminal E reference. While one of each of the parallel paths is open, the other of the parallel paths is closed so that the E reference voltage is present on the collectors and emitters of all the transistors. This bias voltage establishes the D.C. voltage level on all emitters and collectors so that reliable switching mode operation of the transistors can be performed. The voltage must then be above this reference voltage to open circuit the transistor, i.e. drive it to cut off, and below to permit it to conduct, i.e. operate at saturation.

Suppose the input signals are such that the bases of transistors 16, 17A and 18 are above E reference. Upon inspection it is noted that windings $4e$ and $e$ have been open circuited and are no longer in the output circuit path, which now includes transistor 18A, winding $2e$, transistors 17 and 16A. The output in this instance is 2e. There are eight possible voltage steps in the output of this device, ranging from 0 volts to 7e volts. The number of windings can, of course, be increased, and the total load voltage is then divided into $2^N$ steps, where there are N output windings on the transformer. For example, ten windings could be employed, and a ten-digit parallel binary number could be converted to an A.C. analog voltage whose error would be no greater than $\frac{1}{2}^{10}$ or 0.1 percent.

Figure 4:
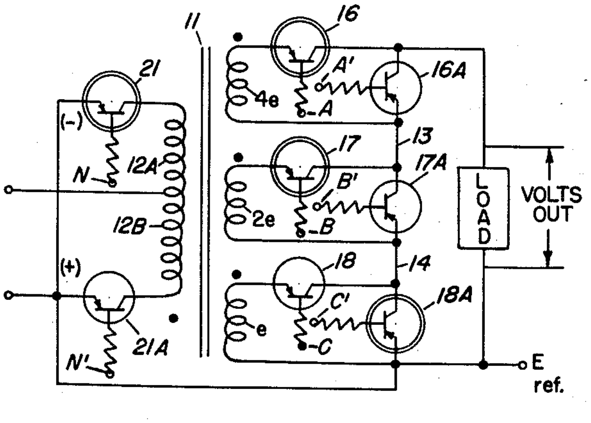
Figure 4 shows another embodiment having positive and negative outputs.

The embodiments shown in Figure 3 and Figure 4 are capable of positive and negative voltage outputs. Here the minus sign indicates phase-reversal, ranging from −8e (Figure 3) or −7e (Figure 4) to 0 to +7e volts output. For simplicity and to facilitate ease of understanding the transistors are shown as circles with the double circle depicting conducting transistors and the single circle representing open circuit transistors in an illustrative example. In Figure 3 a fourth winding, −8e, is shown wound in an opposite direction to the others, as represented by the dot at the opposite end. When the −8e winding is in the circuit input path, it has a subtractive effect since it opposes the other voltages. In the example shown in Figure 3, the −8e, 4e and 2e windings are in circuit for an output of −2e volts. Negative digital inputs may be formed by taking the two's complement of the positive digital number and using the −8e winding. The following shows the various possible digital input combinations and the resultant voltage output for the embodiment shown in Figure 3. The numeral "1" means that winding is in circuit and the numeral "0" means it is not.

| Digital Input | | | | Voltage Output |
|---|---|---|---|---|
| −8e | 4e | 2e | e | |
| 0 | 1 | 1 | 1 | 7e |
| 0 | 1 | 1 | 0 | 6e |
| 0 | 1 | 0 | 1 | 5e |
| 0 | 1 | 0 | 0 | 4e |
| 0 | 0 | 1 | 1 | 3e |
| 0 | 0 | 1 | 0 | 2e |
| 0 | 0 | 0 | 1 | e |
| 0 | 0 | 0 | 0 | 0 |
| 1 | 1 | 1 | 1 | −e |
| 1 | 1 | 1 | 0 | −2e |
| 1 | 1 | 0 | 1 | −3e |
| 1 | 1 | 0 | 0 | −4e |
| 1 | 0 | 1 | 1 | −5e |
| 1 | 0 | 1 | 0 | −6e |
| 1 | 0 | 0 | 1 | −7e |
| 1 | 0 | 0 | 0 | −8e |

Figure 4 shows another embodiment and method for obtaining positive and negative voltage output increments. Here the transformer output windings are the same as in Figure 1. The input winding however is center tapped with both ends of the winding connected to a common terminal and the center tap connected to the other terminal by which the transformer is energized. The upper winding 12A has a transistor 21 connected with its emitter-collector in circuit and bears a minus sign to indicate phase reversal. Transistor 21A is similarly connected in the lower winding 12B path and bears a plus sign to indicate in-phase. These transistors are complementary and operate in the same manner as the others. The same digital inputs used in obtaining positive voltage outputs are used to obtain negative voltage outputs. The only change is in the sign caused by making transistor 21 conducting and transistor 21A open circuited. In other words, negative digital inputs (and therefore negative voltage outputs) are obtained by making the sign digit "1" instead of "0," where the sign digit "1" means that minus transistor 21 is conducting and the plus transistor 21A is open circuited. The following shows the various possible digital input combinations and the resultant voltage output for the embodiment shown in Figure 4.

| Digital Input | | | | Voltage Output |
|---|---|---|---|---|
| Sign | 4e | 2e | e | |
| 0 | 1 | 1 | 1 | 7e |
| 0 | 1 | 1 | 0 | 6e |
| 0 | 1 | 0 | 1 | 5e |
| 0 | 1 | 0 | 0 | 4e |
| 0 | 0 | 1 | 1 | 3e |
| 0 | 0 | 1 | 0 | 2e |
| 0 | 0 | 0 | 1 | e |
| 0 | 0 | 0 | 0 | 0 |
| 1 | 0 | 0 | 1 | −e |
| 1 | 0 | 1 | 0 | −2e |
| 1 | 0 | 1 | 1 | −3e |
| 1 | 1 | 0 | 0 | −4e |
| 1 | 1 | 0 | 1 | −5e |
| 1 | 1 | 1 | 0 | −6e |
| 1 | 1 | 1 | 1 | −7e |

The double circles or conducting transistors illustrated show an output of −6e volts.

PNP transistors have been shown in the drawings although it is to be understood that there are other suitable types of transistors known in the art which may be used as desired.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A digital to analog converter comprising a plurality of voltage sources, said sources being a geometric progression of a reference voltage unit, said sources being serially connected to form a voltage source path, the source of highest progression being reversed in phase from the rest of said sources, a parallel by-pass path connected across each of said sources, and means for selectively connecting certain voltage sources and the associated parallel by-pass paths of the remaining of said voltage sources in circuit to form said voltage source path, said means comprising a transistor connected in series with each of said voltage sources and a complementary transistor connected in each of said parallel by-pass paths, and signal means for rendering one of said transistors electrically conductive and the other of said transistors electrically resistive.

2. A digital to analog converter comprising a plurality of voltage sources, said sources being serially connected to form a voltage source path, each of said voltage sources having a parallel by-pass path connected thereacross, means for selectively replacing certain of said sources with its associated by-pass path in said voltage source path, and means for reversing the phase of said voltage sources, said voltage sources comprising a transformer having a plurality of output windings, a pair of phase reversed primary windings, said phase reversing means comprising a pair of transistors each of which is connected in series to one of said primary windings and having a D.C. reference voltage on the emitters and collectors thereof, and voltage means for alternately raising the voltage on the bases of said transistors to a value above said D.C. reference voltage.

3. In a digital to A.C. analog converter comprising a plurality of A.C. sources having series connections therebetween and alternate by-pass paths connected in parallel thereto for providing an electrical path when said A.C. sources are not electrically connected therein, D.C. means for selecting which of said A.C. sources and which by-pass paths comprise said electrical path, said D.C. means comprising transistors connected in series with said A.C. sources and transistors connected in said by-pass paths, a D.C. reference voltage applied to the emitters and collectors of all said transistors, and digital D.C. means for selectively raising the voltage on the bases of certain of said transistors above the value of said D.C. reference voltage to thereby electrically connect certain of said A.C. voltage sources in said electrical path.

References Cited in the file of this patent

UNITED STATES PATENTS

| | | |
|---|---|---|
| 2,570,221 | Earp et al. | Oct. 9, 1951 |
| 2,738,504 | Gray | Mar. 13, 1956 |
| 2,817,078 | Pfeiffer | Dec. 17, 1957 |
| 2,827,233 | Johnson et al. | Mar. 18, 1958 |
| 2,891,171 | Shockley | June 16, 1959 |

FOREIGN PATENTS

| | | |
|---|---|---|
| 731,650 | Great Britain | June 8, 1955 |